(12) United States Patent
Sakata et al.

(10) Patent No.: US 7,609,507 B2
(45) Date of Patent: Oct. 27, 2009

(54) DISPLAY DEVICE

(75) Inventors: Tatsuya Sakata, Tokyo (JP); Makoto Miyashita, Tokyo (JP); Toyoki Takahashi, Kanagawa (JP); Daiki Adachi, Kanagawa (JP); Sachiko Koyama, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/125,230

(22) Filed: May 22, 2008

(65) Prior Publication Data

US 2008/0291615 A1 Nov. 27, 2008

(30) Foreign Application Priority Data

May 23, 2007 (JP) ............... 2007-137111

(51) Int. Cl.
*G06F 1/16* (2006.01)
(52) U.S. Cl. ............... 361/679.21; 248/176.1; 248/425
(58) Field of Classification Search ............ 361/679.21; 248/159, 425, 176.1
See application file for complete search history.

(56) References Cited

U.S. PATENT DOCUMENTS

| | | | | |
|---|---|---|---|---|
| 4,438,458 | A | * | 3/1984 | Munscher .................. 348/838 |
| D383,739 | S | * | 9/1997 | Gilgen ...................... D14/375 |
| 6,189,602 | B1 | | 2/2001 | Tanahashi et al. |
| 6,695,274 | B1 | * | 2/2004 | Chiu ......................... 248/371 |
| 7,035,090 | B2 | * | 4/2006 | Tanaka et al. .......... 361/679.21 |
| 7,251,128 | B2 | * | 7/2007 | Williams et al. ........ 361/679.55 |
| 2004/0057197 | A1 | * | 3/2004 | Hill et al. ..................... 361/683 |
| 2005/0002159 | A1 | * | 1/2005 | Jeong ......................... 361/683 |
| 2005/0201046 | A1 | * | 9/2005 | Hwang et al. ............... 361/681 |
| 2008/0290239 | A1 | * | 11/2008 | Sakata et al. ................ 248/425 |
| 2008/0291613 | A1 | * | 11/2008 | Sakata et al. ................ 361/681 |
| 2008/0291614 | A1 | * | 11/2008 | Sakata et al. ................ 361/681 |
| 2008/0315048 | A1 | * | 12/2008 | Sakata et al. ................ 248/159 |

FOREIGN PATENT DOCUMENTS

| | | |
|---|---|---|
| JP | 3-113423 | 11/1991 |
| JP | 6-979 | 1/1994 |
| JP | 10-222091 | 8/1998 |
| JP | 11-102235 | 4/1999 |
| JP | 11-215448 | 8/1999 |
| JP | 3087252 | 7/2000 |
| JP | 2000-242363 | 9/2000 |
| JP | 2002-23651 | 1/2002 |

OTHER PUBLICATIONS

Japanese Office Action for Japanese Patent Application No. 2007-137111, dated Apr. 16, 2009.

* cited by examiner

*Primary Examiner*—Lisa Lea-Edmonds
(74) *Attorney, Agent, or Firm*—Finnegan, Henderson, Farabow, Garrett & Dunner, L.L.P.

(57) ABSTRACT

A display device includes a body unit; a display panel of flat plate shape arranged with a display screen; at least one hinge plate connected to a rear surface of the display panel; shafts arranged extending along a lower end of the display panel, and turnably attached with the hinge plate with respect to a center axis; and a supporting unit, connected to the shaft at an upper end and connected to the body unit at a lower end, for supporting a display unit in a cantilever state.

5 Claims, 16 Drawing Sheets

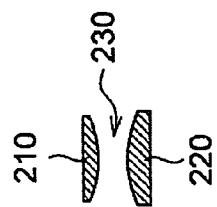
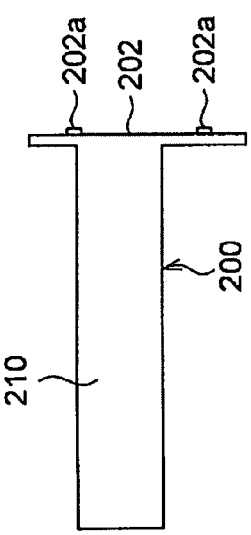
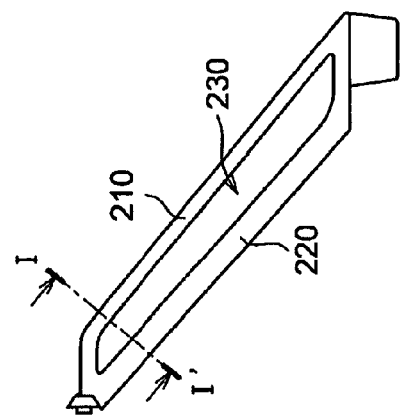
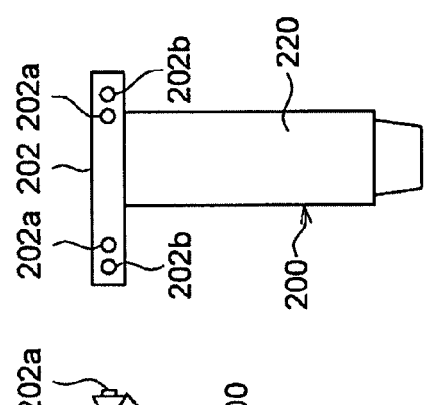
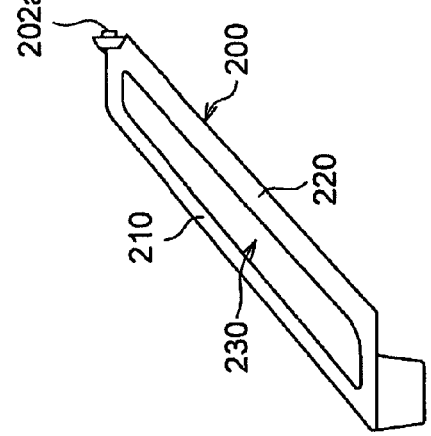
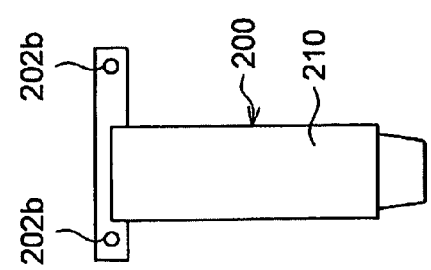
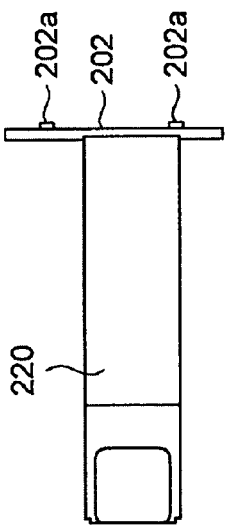

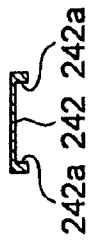
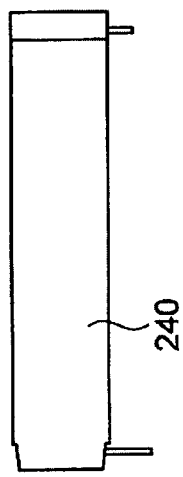
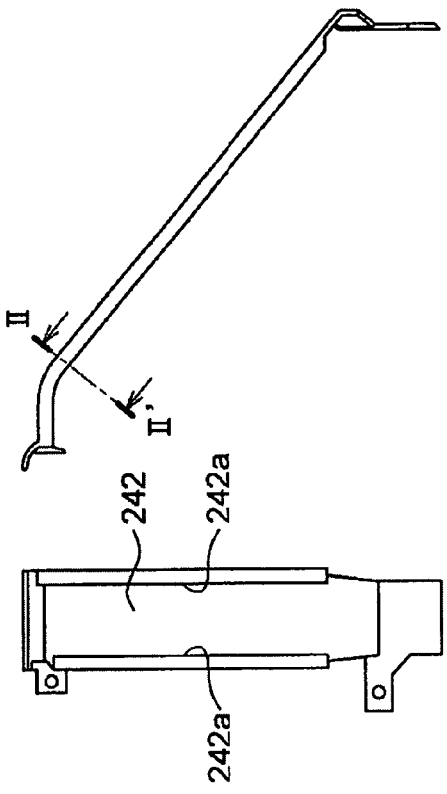
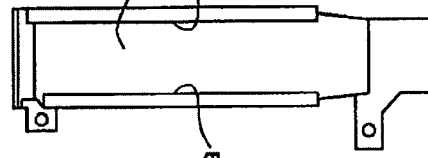
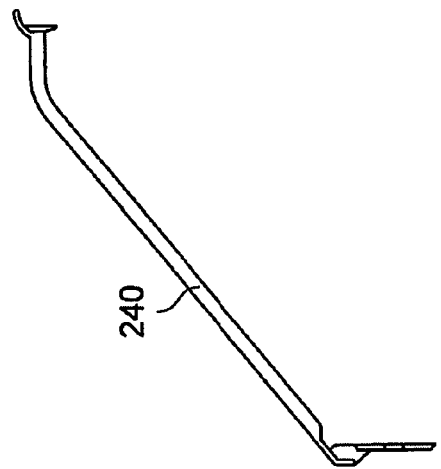
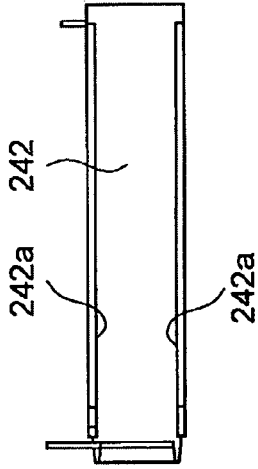
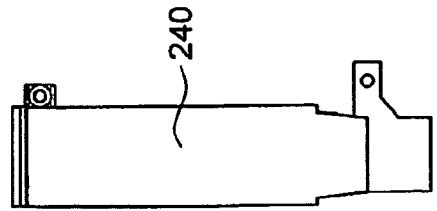

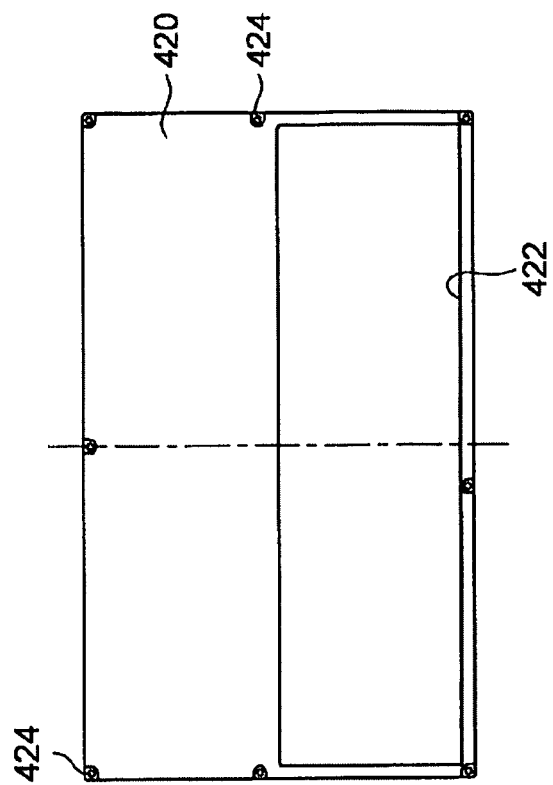
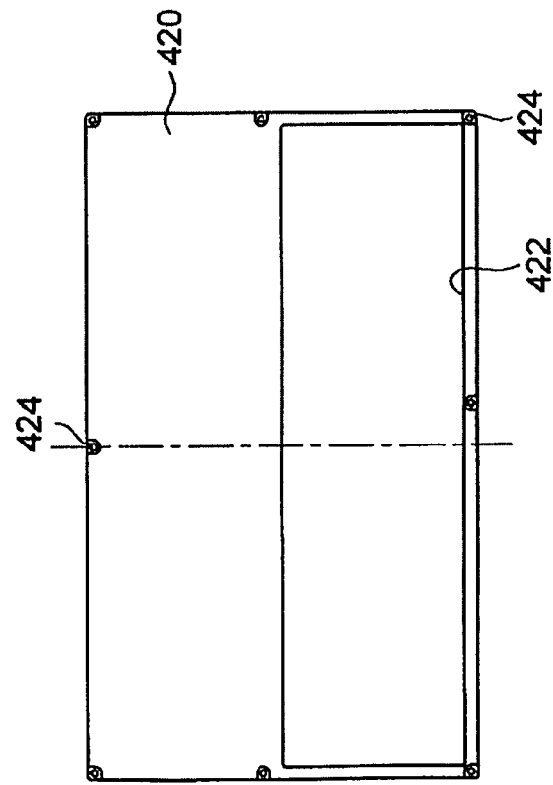

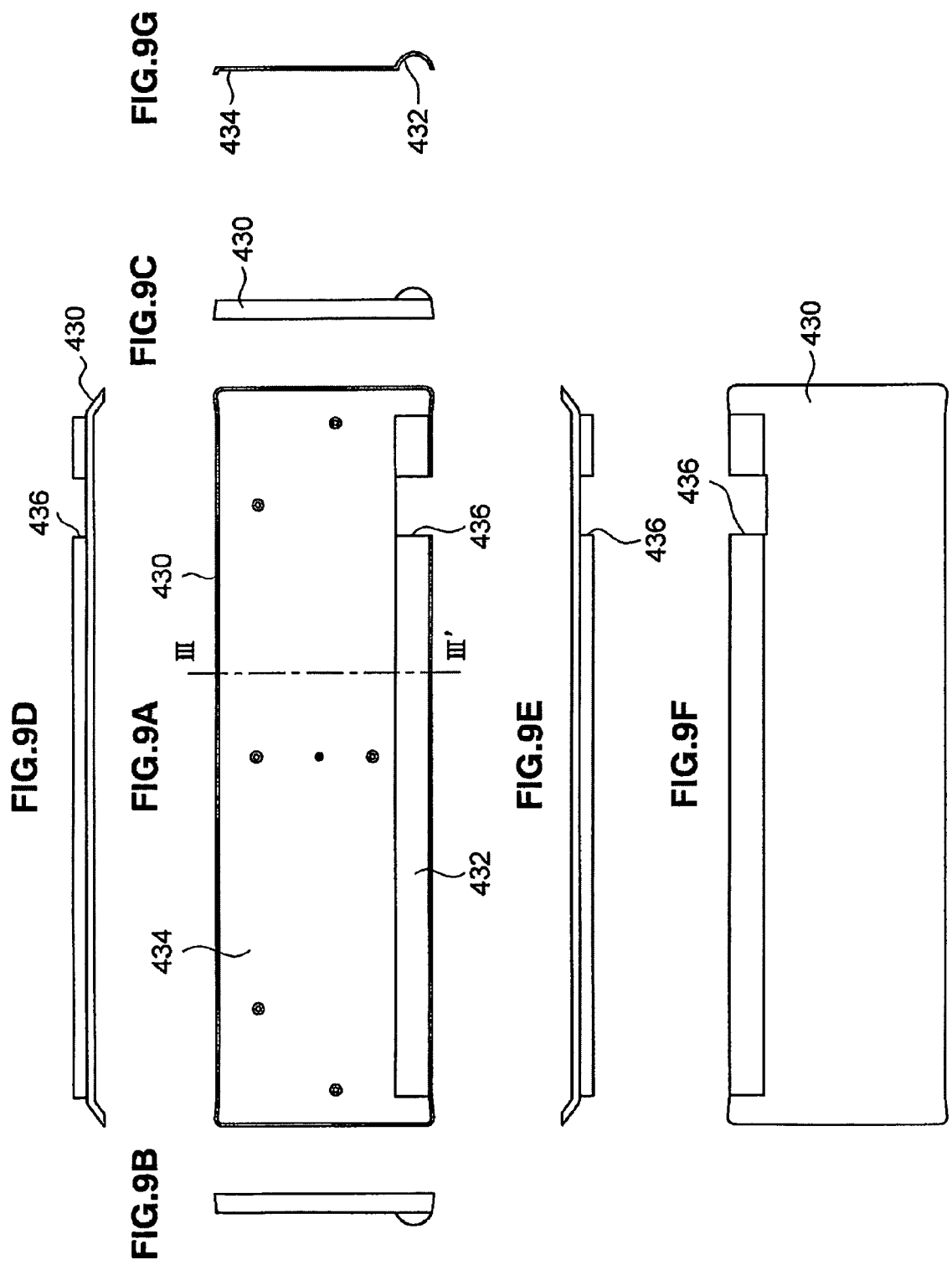

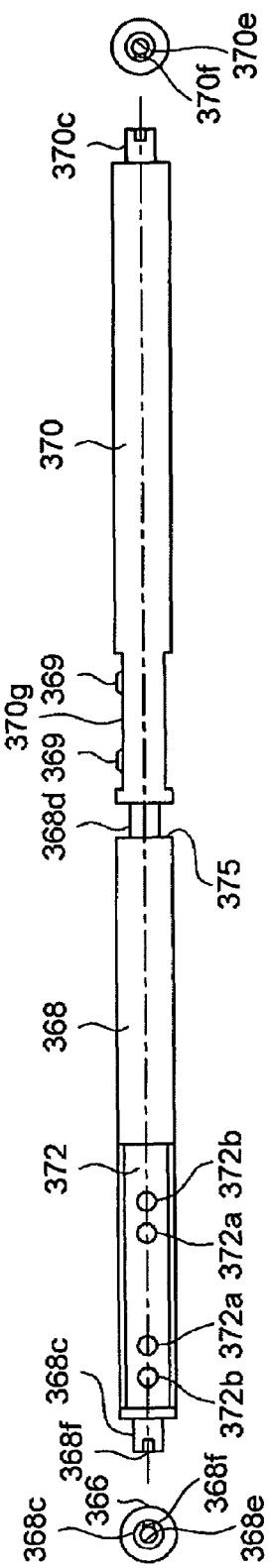
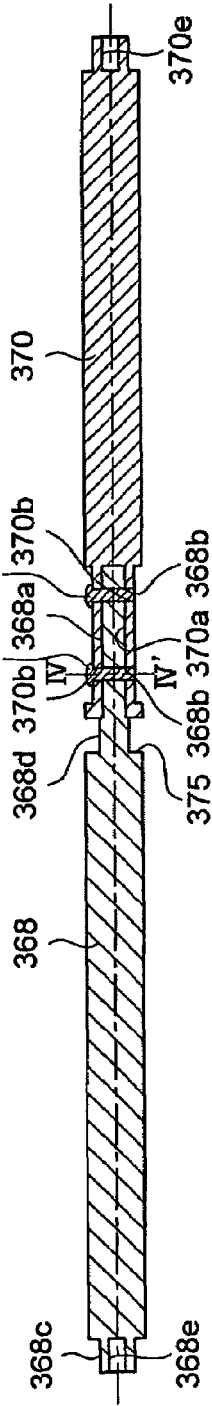
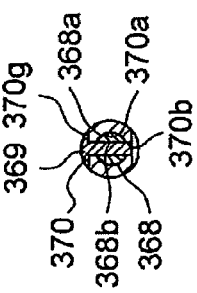
FIG.14A
FIG.14B
FIG.14C

DISPLAY DEVICE

CROSS REFERENCES TO RELATED APPLICATIONS

The present invention contains subject matter related to Japanese Patent Application JP 2007-137111 filed in the Japan Patent Office on May 23, 2007, the entire contents of which being incorporated herein by reference.

BACKGROUND OF THE INVENTION

1. Field of the Invention

The present invention relates to a display device.

2. Description of the Related Art

In related art, a structure in which a supporting unit for turnably supporting a display panel at both ends of a body unit arranged with a keyboard is arranged, and the display panel is supported at two locations on both ends in the width direction of the display panel is known in a laptop as disclosed in Japanese Patent Application Laid-Open No. 11-102235 as a structure for supporting a display panel arranged with a screen of the display device.

In a liquid crystal display panel etc. of a desktop personal computer, a supporting arm is generally arranged standing upward from the body unit of the liquid crystal panel placed on a table etc., and a central part in the width direction of the liquid crystal panel is supported with the supporting arm.

[Patent document 1] Japanese Patent Application Laid-Open No. 11-102235

SUMMARY OF THE INVENTION

However, since the display device of the related art relates to a structure for supporting the central part or both ends in the width direction of the display panel, the structural portion connecting to the display panel from the body unit by way of the supporting unit inevitably comes into view when the user views the display panel. Thus, for the user, the display panel supporting structure from the display panel to the body unit through the supporting unit comes into view even though the user wants to closely look only at the display screen. Thus, an extra structure comes into the view of the user, and the user is not able to focus and closely look only at the display screen.

If the supporting unit of the display panel is arranged at the central part or both ends of the display panel, the degree of freedom in the arrangement of the supporting unit with respect to the body unit or the display panel lowers, and thus the arrangement of operation buttons becomes limited by the position of the supporting unit when arranging operation buttons on the body unit etc.

In order to prevent structures other than the display surface from coming into view as much as possible, a configuration of arranging the supporting unit of the display device shifted from the central part in the lateral direction of the display panel, and supporting the display panel in a cantilever manner can be newly considered.

The rigidity of the supporting unit is desirably enhanced to reliably support the weight of the display panel in order to support the display panel in a cantilever manner. A mechanism for adjusting the tilt of the display panel is desirably arranged to enhance the visibility of the display screen. However, a supporting method for adjusting the tilt position and reliably supporting the display panel in a cantilever manner has not been proposed.

The present invention addresses the above-identified problems, and it is desirable to provide a novel and an improved display device capable of reliably supporting the display panel in a cantilever manner and adjusting the tilt position by turning the display panel.

According to an embodiment of the present invention, there is provided a display device including a body unit; a display panel of flat plate shape arranged with a display screen; at least one hinge plate connected to a rear surface of the display panel; shafts arranged extending along a lower end of the display panel, and turnably attached with the hinge plate with respect to a center axis; and a supporting unit, connected to the shaft at an upper end and connected to the body unit at a lower end, for supporting a display unit in a cantilever state.

According to such configuration, at least one hinge plate is arranged and connected to the rear surface of the display panel. The shafts are arranged extending along the lower end of the display panel, and the hinge plate is turnably attached with respect to the center axis of the shaft. The supporting unit is connected to the shaft at the upper end and connected to the body unit at the lower end. Therefore, the shafts arranged extending along the lower end of the display unit become rigid members integrated with the supporting unit, and the display panel can be reliably supported in a cantilever state by the hinge plate attached to the shaft. The tilt position of the display can be adjusted since the hinge plate is turnably attached with respect to the shaft.

Furthermore, the hinge plate may include an engagement part turnably inserted to at least both ends of the shaft. According to such configuration, the engagement part is inserted to both ends of the shaft, and the hinge plate is connected to the shaft and both ends by the engagement part, whereby the hinge plate can be turnably supported at both ends of the shaft, and the hinge plate can be smoothly turned.

Moreover, the hinge plate may be divided to at least two or more parts. According to such configuration, at least two or more hinge plates are arranged, and each divided hinge plate is connected to the rear surface of the display unit and is turnably connected with respect to the center axis of the shaft. Therefore, the rigidity of each hinge plate enhances, and twist of the hinge plate can be suppressed.

Moreover, the shaft may be configured by at least two or more divided shafts corresponding to the divided hinge plate. According to such configuration, at least two or more divided shafts are arranged in correspondence to the divided hinge plate, and thus the divided hinge plate can be turnably attached with respect to each divided shaft.

At least one of the divided hinge plates may further include an engagement part turnably inserted to a vicinity of a coupling part of the divided shaft. According to such configuration, at least one of the divided hinge plates further includes an engagement part turnably inserted to a vicinity of a coupling part of the divided shaft, and thus the engaging location with the shaft can be increased in the hinge plate as a whole in cooperation with the engagement part inserted to both ends of the shaft. Therefore, the hinge plate can be reliably held with respect to the shaft, and a smooth operation of the hinge plate can be realized.

According to the embodiments of the present invention described above, a display device capable of reliably supporting the display panel in a cantilever manner, and capable of adjusting the tilt position by turning the display panel can be provided.

BRIEF DESCRIPTION OF THE DRAWINGS

FIGS. 4A to 4G are frame format views showing a configuration of the arm unit in detail;

FIGS. 5A to 5G are frame format views showing a configuration of a cover of the arm unit in detail;

FIGS. 8A and 8B are frame format views showing a configuration of a rear cover;

FIGS. 9A to 9G are frame format views showing a configuration of a T-cover;

FIGS. 14A to 14C are frame format views showing a configuration of a shaft in detail;

DETAILED DESCRIPTION OF THE PREFERRED EMBODIMENTS

Figure 1:
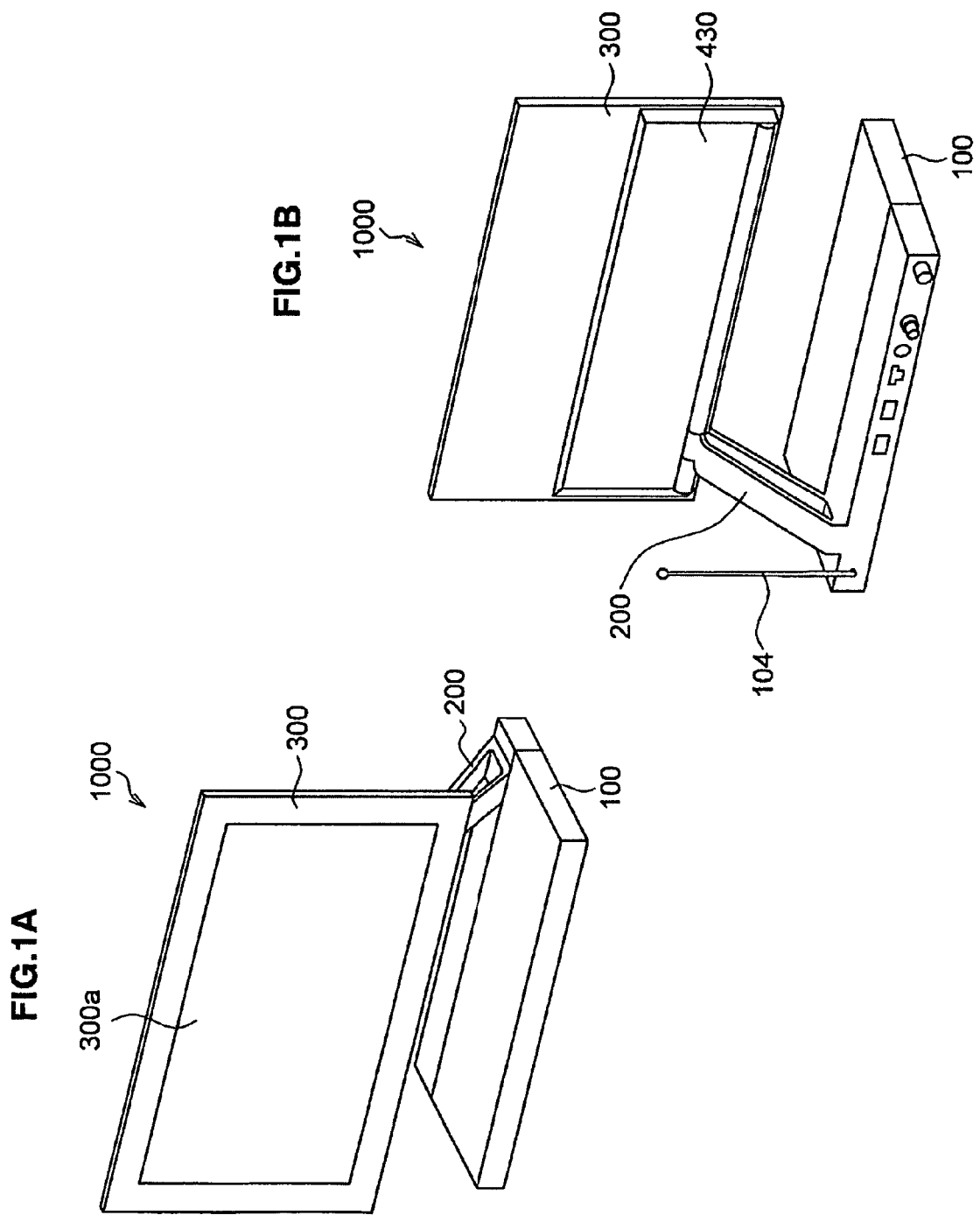
FIG. 1 is a schematic perspective view showing an outer appearance of a display device according to one embodiment of the invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

[Overall Configuration of Display Device]

Figure 2:
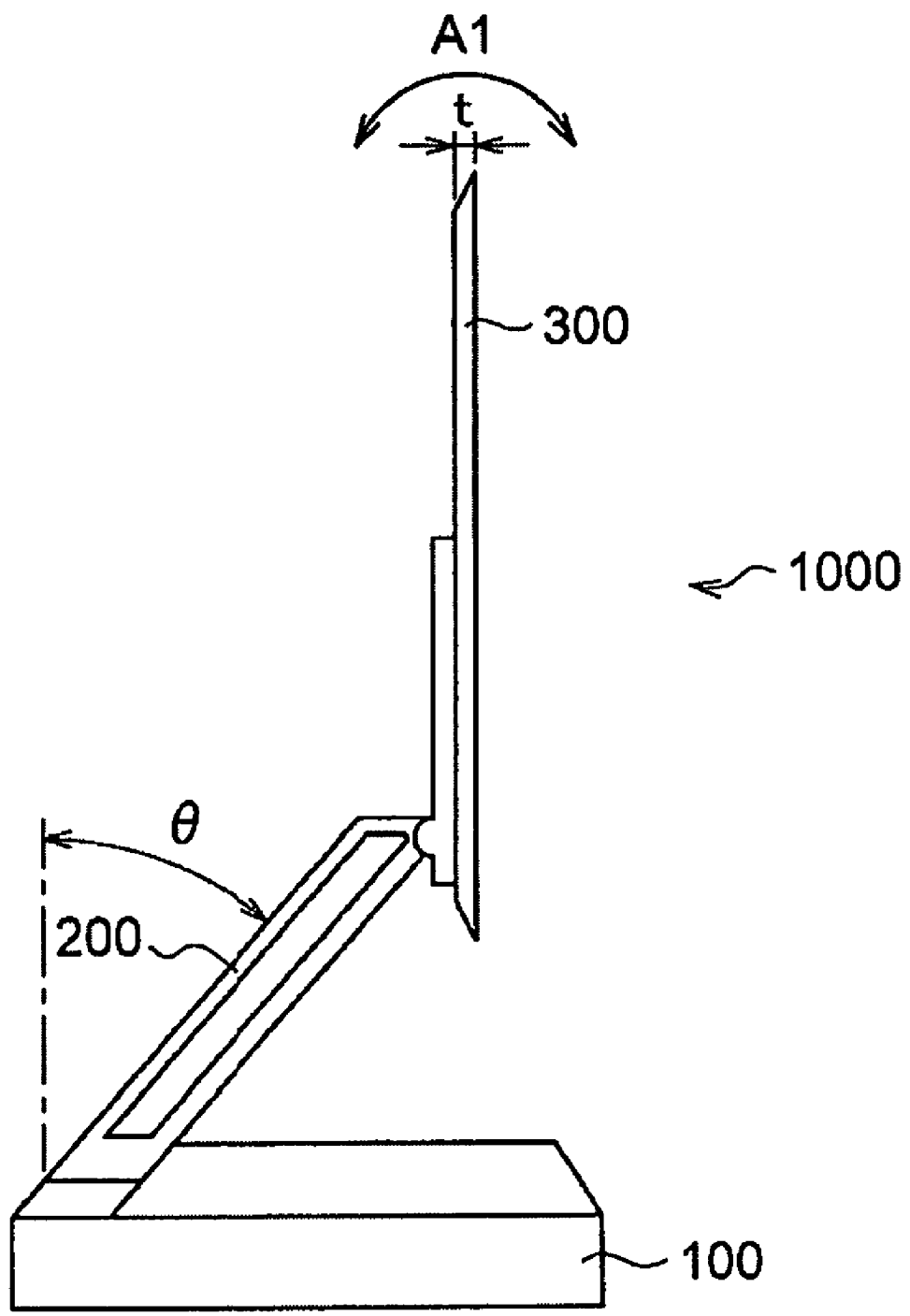
FIG. 2 is a schematic perspective view showing the display device seen from the left on the front surface side.

FIG. 1 is schematic perspective views showing an outer appearance of a display device 1000 according to one embodiment of the present invention. FIG. 1A is a schematic perspective view showing the display device 1000 seen from the upper right on the front surface side. FIG. 1B is a perspective view showing the display device 1000 seen from the upper right on the back surface side of the display device 1000. FIG. 2 is a schematic perspective view showing the display device 1000 seen from the left on the front surface side.

As shown in FIGS. 1 and 2, the display device 1000 of the present embodiment is configured to include a body stand unit (body unit) 100, an arm unit (supporting unit) 200, and a display displaying unit (display unit) 300. The display device 1000 receives television broadcast pictures etc., and displays the same on a display screen 300a of the display displaying unit 300.

The display displaying unit 300 includes a display panel (organic EL (electro luminescence) panel) 320 for displaying images using organic EL phenomenon. The organic EL panel 320 is configured to include a plurality of organic EL elements, which are self-emitting elements, and does not include configurations such as backlight, and thus the thickness thereof can be made sufficiently thin. As shown in FIG. 2, the display displaying unit 300 of the present embodiment is a thin panel having a very thin thickness, the thickness t being suppressed to less than or equal to about a few mm (about 3 mm).

The arm unit 200 is arranged at one location on the back side of the body stand unit 100 and is arranged standing upward from the body stand unit 100. The arm unit 200 is arranged more to the right side than the center in the transverse direction (horizontal direction) of the body stand unit 100 when the display device 1000 is seen from the front surface side, and is connected on the right side than the center in the transverse direction of the display displaying unit 300. Thus, in the display device 1000 of the present embodiment, the arm unit 200 is arranged on one of the left or the right side from the center in the horizontal direction of the display displaying unit 300, and the display displaying unit 300 is supported in a cantilever manner.

A backlight is necessary in the case of a liquid crystal display, and thus the thickness of the display unit becomes thicker and the weight becomes heavier. In particular, considering usage for a display of displaying television pictures rather than for a computer display, greater number of backlights is arranged than in the computer display to ensure image quality as a television receiver. In addition to backlights, an inverter for controlling the backlight is also necessary in the liquid crystal display. Thus, in the case of the liquid crystal display, the weight is heavier and the rigidity of the displaying unit including the arm unit is greatly enhanced to support the display unit in a cantilever manner, whereby the structure becomes complicating and the weight becomes heavier. Therefore, it is not realistic to support the liquid crystal display in a cantilever manner in view of convenience of the user, manufacturing cost, and the like.

The organic EL panel is made up of organic EL elements, which are self-emitting elements, and thus does not need backlights and configuration members such as an inverter related thereto, and can be configured light only with the panel made of thin-plate glass. Therefore, according to the present embodiment, the display displaying unit 300 itself can be configured to a very light weight, and the display displaying unit 300 can be supported in a cantilever manner.

The display displaying unit 300 is turnable in the direction of an arrow A1 in FIG. 2 with the coupling part with respect to the arm unit 200 as the center, and the user can set a tilt position of the display displaying unit 300 to a desired angle.

In the display panel of the related art, the member for supporting the display panel supports the central part in the transverse direction of the display panel from the lower side in the case of one-point support. In the case of two-point support, the vicinity of both ends in the transverse direction of the display panel is supported from the lower side. In the present embodiment, the arm unit 200 is arranged shifted from the central part in the transverse direction of the display displaying unit 300 and the display displaying unit 300 is supported in a cantilever manner, and thus the arm unit 200 is out of the view of the user, and the user can independently recognize only the display screen 300a. The user can get an impression as if the display displaying unit 300 is floating on the body stand unit 100 without the arm unit 200. The user then can independently and closely look only at the display screen 300a by supporting the display displaying unit 300 in a cantilever manner.

The degree of freedom in installing the arm unit 200 enhances since there is no need to connect the root of the arm unit 200 to the central part of the body stand unit 100. Thus, the installing position of the arm unit 200 with respect to the body stand unit 100 can be determined in view of the arrangement etc. of the internal structure of the body stand unit 100 and the substrate, and the degree of freedom of design can be enhanced. The configuring members can be arranged in the most efficient manner in view of the internal structure of the body stand unit 100, and the size of the display device 1000 can be suppressed to a minimum. Furthermore, since the arm unit 200 is not arranged at the central part of the body stand unit 100, a wide effective space can be created at the upper surface of the body stand unit 100, and the display part, the operation button, the LED display lamp etc. can be freely arranged on the upper surface of the body stand unit 100.

As shown in FIGS. 1A, 1B, and 2, the arm unit 200 is arranged inclined towards the back surface of the display displaying unit 300 from the rear side of the body stand unit 100. In FIG. 2, an inclination angle θ of the arm unit 200 with respect to a perpendicular direction is about 45 to 60°. When the display displaying unit 300 is viewed from the front surface, the arm unit 200 will be hidden behind the display displaying unit 300, thereby suppressing the arm unit 200 from being recognized in the view of the user. Therefore, the arm unit 200 can be reliably suppressed from being recognized in the view of the user according to the synergetic effect of arranging the arm unit 200 in a shifted manner from the central part of the display displaying unit 300.

The connection state of the display displaying unit 300 and the body stand unit 100 is suppressed from being directly recognized by the user since only the display displaying unit 300 and the body stand unit 100 appear in the view of the user and the arm unit 200 barely comes into view. The user thus feel as if the display displaying unit 300 is floating in space.

In the configuration of the present embodiment, the lightness of the display displaying unit 300 is emphasized and recognized by the user since the thickness of the display displaying unit 300 is very thin or about a few mm. Therefore, for the user, the display displaying unit 300 excelling in floating feeling and lightness is provided by the synergetic effect with the feeling as if the display displaying unit 300 is floating in space.

The user then can closely look at only the display content of the display displaying unit 300, which is recognized as if floating in space, and can concentrate on the display content without being distracted by other structures. A display device 1000 in which a satisfactory designability can be maintained while creating a feeling the display screen 300a is floating to the user, and in which the visibility of the display screen 300a is greatly enhanced can be provided.

[Configuration of Arm Unit]

Figure 3:
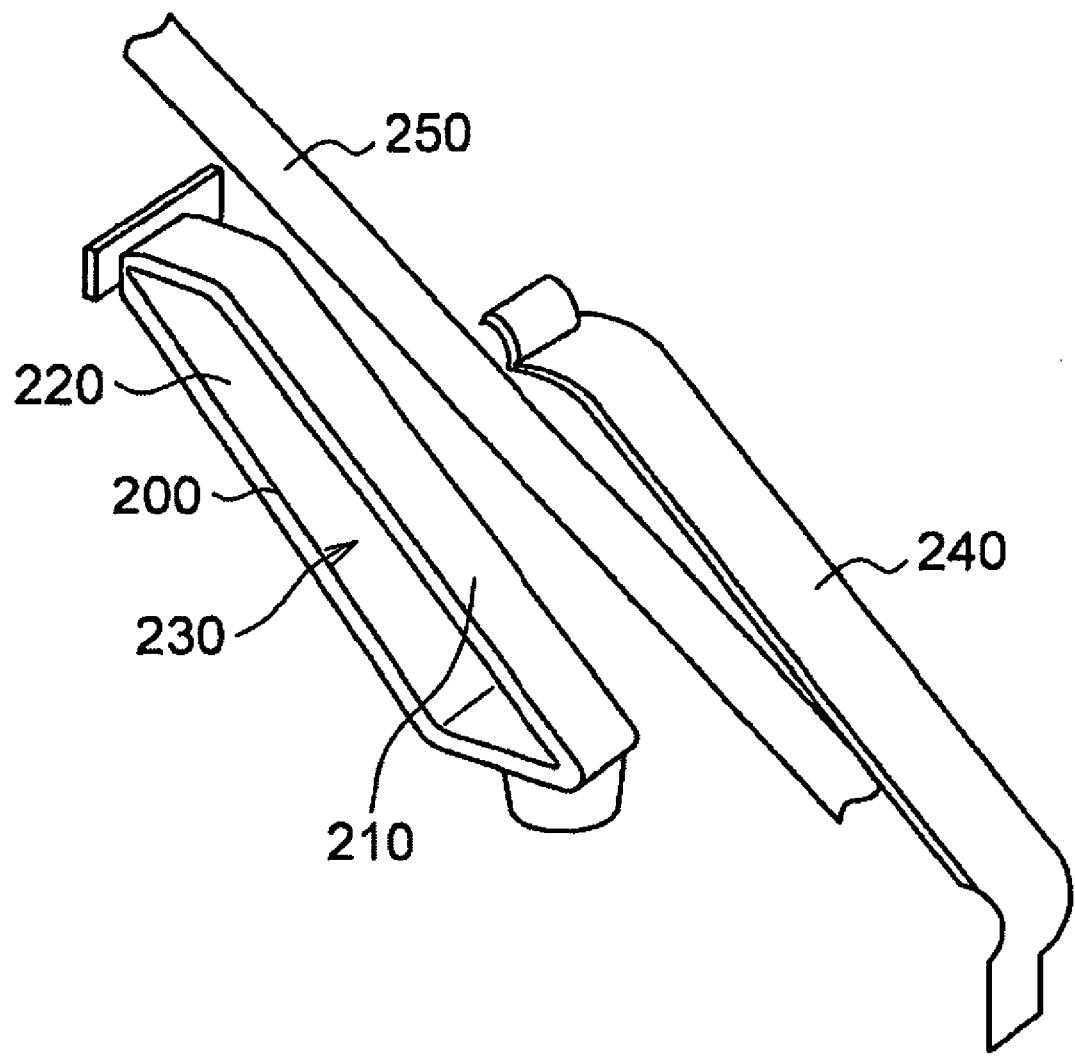
FIG. 3 is a frame format view showing a configuration of an arm unit.

FIG. 3 is a frame format view showing a configuration of the arm unit 200. As shown in FIG. 3, an opening 230 passing through the side face is formed in the arm unit 200 along the longitudinal direction thereof to have a hollow structure. According to such hollow structure, the arm unit 200 is configured by a first arm unit 210 positioned on the upper part, and a second arm unit 220 positioned on the lower part. The first arm unit 210 and the second arm unit 220 are configured to a thin flat plate shape and are arranged facing each other with the opening 230 interposed in between, and the thickness of the first arm unit 210 and the second arm unit 220 are suppressed to a minimum.

As described above, the display displaying unit 300 is very thin and is configured to excel in lightness and floating feeling. Therefore, with respect to the arm unit 200 for supporting the display displaying unit 300, a configuration excelling in lightness and floating feeling is obtained similar to the display displaying unit 300 by suppressing the thickness to a minimum with the hollow structure, and lightness and floating feeling can be emphasized for the display device 1000 as a whole.

Since the weight of the liquid crystal display is heavy, it is difficult to have the arm unit as a hollow structure to obtain lightness and airiness in order to ensure strength. In the present embodiment, the necessary strength can be ensured even if the arm unit 200 has a hollow structure since the display displaying unit 300 is configured by the organic EL panel 320. Therefore, the display displaying unit 300 can be reliably supported, and a satisfactory designability excelling in lightness and airiness can be ensured.

A cover 240 is placed over the upper surface of the first arm unit 210. A flexible print substrate 250 for electrically connecting the body stand unit 100 and the display displaying unit 300 is incorporated between the upper surface of the first arm unit 210 and the cover 240.

FIGS. 4A to 4G are frame format views showing the configuration of the arm unit 200 in detail. FIG. 4A is a front view of the arm unit 200 seen from the front surface side of the display displaying unit 300, FIG. 4B is a left side view, FIG. 4C is a right side view, FIG. 4D is a top view, FIG. 4E is a bottom view, FIG. 4F is a rear view, and FIG. 4G is a cross sectional view taken along a chain dashed line I-I' in FIG. 4C. The body of the arm unit 200 with the cover 240 detached can be configured as an integrated block through casting or machining with metal such as aluminum as the raw material.

FIGS. 5 is a frame format view showing a configuration of the cover 240 in detail. FIG. 5A is a front view of the cover 240 seen from the front surface side of the display displaying unit 300, FIG. 5B is a left side view, FIG. 5C is a right side view, FIG. 5D is a top view, FIG. 5E is a bottom view, FIG. 5F is a rear view, and FIG. 5G is a cross sectional view taken along a chain dashed line II-II' in FIG. 5C. As shown in FIG. 5, the cover includes a concave part 242, and sides walls 242a on both sides of the concave part 242 fit into the side faces in the width direction of the first arm unit 210. The flexible print substrate 250 is arranged between the first arm unit 210 and the cover 240 while being accommodated at the bottom of the concave part 242. The flexible print substrate 250 thus is not exposed to the outside.

The weight of the display displaying unit 300 can be suppressed to a minimum, and the necessary strength can be ensured even if the arm unit 200 has a hollow structure by configuring the display displaying unit 300 with the organic EL panel 320. The display displaying unit 300 configured to be light and thin is obtained, and floating feeling and airiness can be evoked on the user by having the arm unit 200 as a hollow structure and suppressing the volume of the arm unit 200 to a minimum. A structure that prevents the user from being aware of the existence of the wiring is obtained by incorporating the flexible print substrate 250 in the first arm unit 210.

The arm unit 200 may be made of transparent resin material such as polycarbonate and acryl, transparent glass, or the like. A structure that prevents the user from being aware of the existence of the arm unit 200 can be further obtained by having the arm unit 200 transparent. Therefore, the user can look at the display screen 300a, and further floating feeling and airiness of the display device 1000 can be evoked on the user.

[Configuration of Display Displaying Unit]

Figure 6:
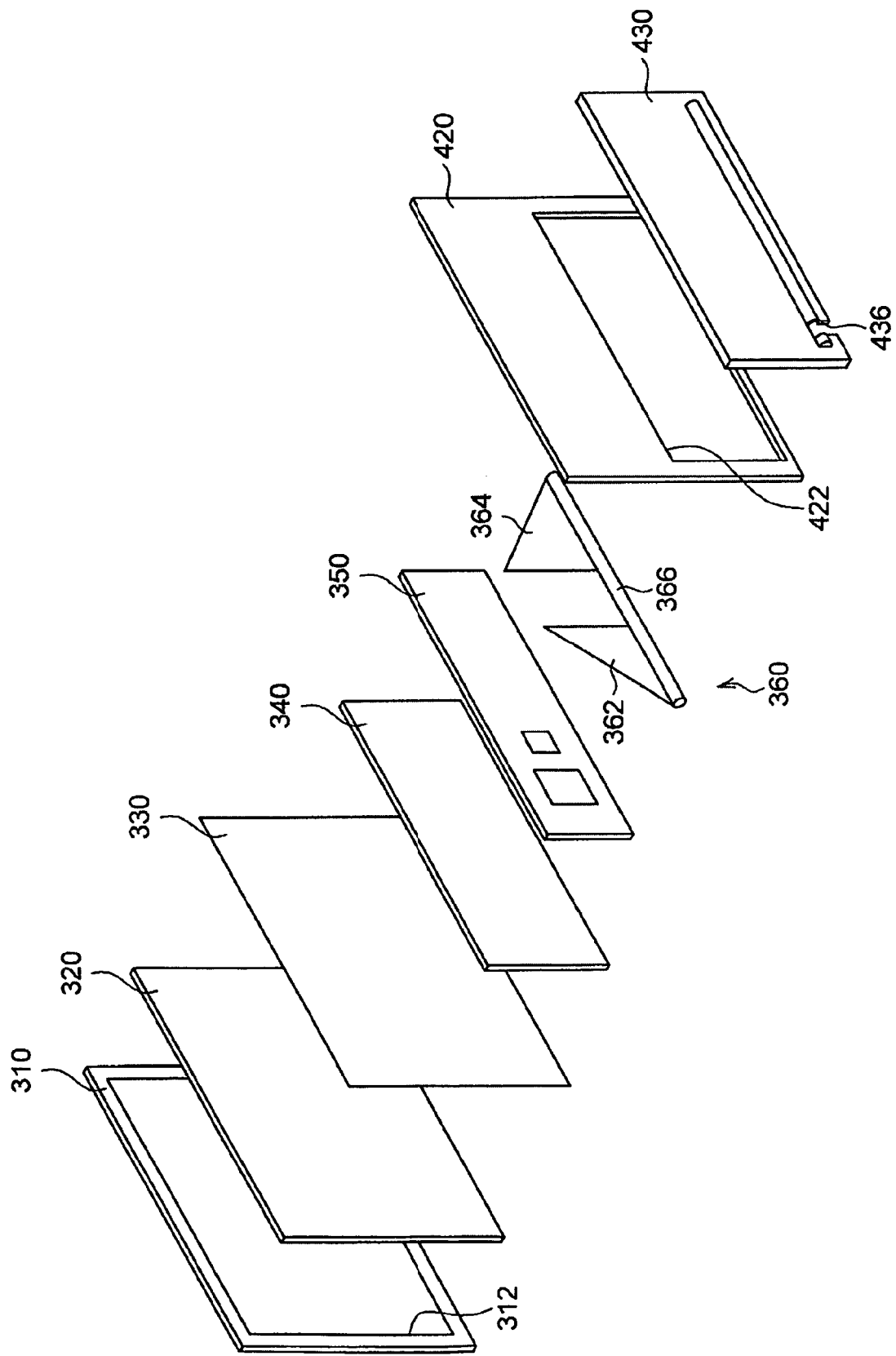
FIG. 6 is an exploded perspective view showing a configuration of a display displaying unit.

FIG. 6 is a frame format view showing a configuration of the display displaying unit 300, and shows an exploded perspective view of the display displaying unit 300. As shown in FIG. 6, the display displaying unit 300 is configured to include a bezel 310, the organic EL panel 320, a graphite sheet 330, a base plate 340, a T-substrate 350, a hinge 360, a rear cover 420, and a T-cover 430.

The base plate 340 is a member that constitutes the main frame of the display displaying unit 300, where the arm unit 200 is coupled to the base plate 340 by way of the hinge 360. The main configuring members such as the organic EL panel 320, the T-substrate 350, and the hinge 360 are fixed with respect to the base plate 340. The main members configuring the display displaying unit 300 such as the organic EL panel 320, the T-substrate 350, the hinge 360, the rear cover 420, and the T-cover 430 are all attached with the base plate 340 as a reference.

The graphite sheet 330 is attached to the back surface of the organic EL panel 320. The organic EL panel 320 is fixed to the base plate 340 through adhesive tape with the surface attached with the graphite sheet 330 facing the base plate 340.

The T-substrate 350 is made of hard substrate, and is connected with the power supply line and the signal line connecting with the organic EL panel 320. The size of the T-substrate 350 corresponds to the size of the base plate 340, and the T-substrate 350 is fixed on the side opposite to the surface fixed with the organic EL panel 320 with respect to the base plate 340.

The hinge 360 is a configuring member for coupling the arm unit 200 and the base plate 340. The hinge 360 is configured to include configuring members such as a first hinge plate 362 and a second hinge plate 364 made of metal and having a triangular plan shape, a shaft 366 made of metal, and the like. The shaft 366 is arranged horizontally along the lower end of the display displaying unit 300. The first hinge plate 362 and the second hinge plate 364 are fixed with respect to the base plate 340, and are turnably attached with respect to the shaft 366. The shaft 366 is fixed with respect to the arm unit 200. Therefore, the base plate 340 can turn with respect to the shaft 366 fixed to the arm unit 200, in which case the center axis of rotation becomes the center axis of the shaft 366. Thus, the display displaying unit 300 can be turned in the direction of the arrow A1 in FIG. 2, and the tilt angle of the display displaying unit 300 can be varied.

The bezel 310 is a member that is attached at the edge of the organic EL panel 320, and that constitutes the outer appearance of the edge of the display displaying unit 300. The rear cover 420 and the T-cover 430 are metal covers that cover the back surface of the display displaying unit 300. The rear cover 420 has an opening 422 formed at a portion corresponding to the position of the T-substrate 350 and the hinge 360, and mainly covers the upper part of the back surface of the display displaying unit 300. The T-cover 430 is configured to be attached in correspondence to the position of the opening 422 so as to cover the T-substrate 350 and the hinge 360.

The base plate 340, the T-substrate 350, and the hinge 360 are all arranged only at the region of less than half of the lower side of the display displaying unit 300, and the area occupied by the base plate 340, the T-substrate 350, and the hinge 360 with respect to the area of the entire display displaying unit 300 is suppressed to a minimum. Other than the region arranged with the base plate 340, the T-substrate 350, and the hinge 360, only three members of mainly the organic EL panel 320, the graphite sheet 330, and the rear cover 420 define the thickness of the display displaying unit 300. Therefore, in the region including the upper half of the display displaying unit 300, in particular, the thickness of the display displaying unit 300 can be very thin, and the thickness can be suppressed to about 3 mm, as described above.

Since the display device 1000 is normally placed on the table etc., the user rarely sees the display displaying unit 300 from the lower side, and the thickness of the display displaying unit 300 is recognized from the upper side. Therefore, the thinness of the display displaying unit 300 can be emphasized to the user by arranging the members such as the base plate 340, the T-substrate 350, and the hinge 360 on the lower side of the display displaying unit 300, and suppressing the thickness on the upper side of the display displaying unit 300 to a minimum. Therefore, a satisfactory designability can be maintained while creating a floating feeling and airiness as described above.

Figure 7A:
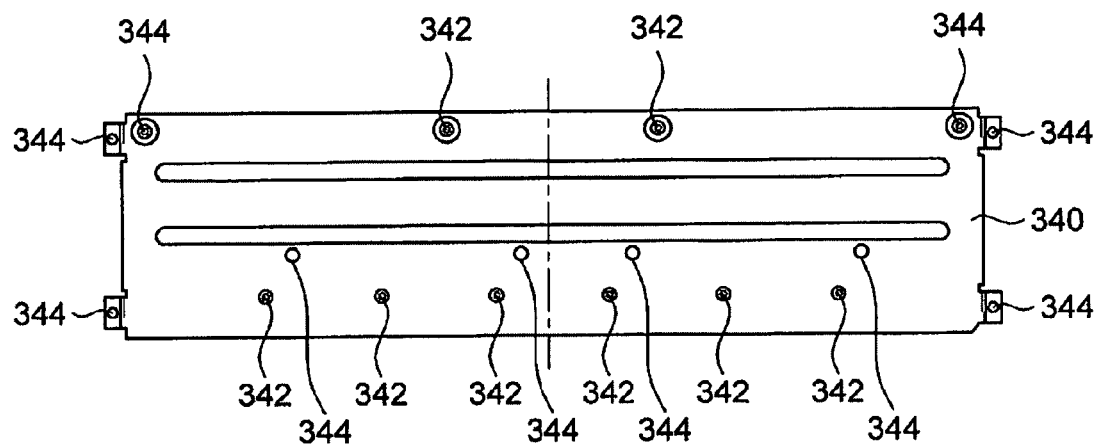
FIGS. 7A to 7C are plan views showing a configuration of a base plate.
Figure 7B:
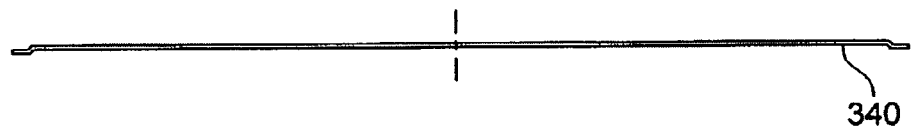
Figure 7C:
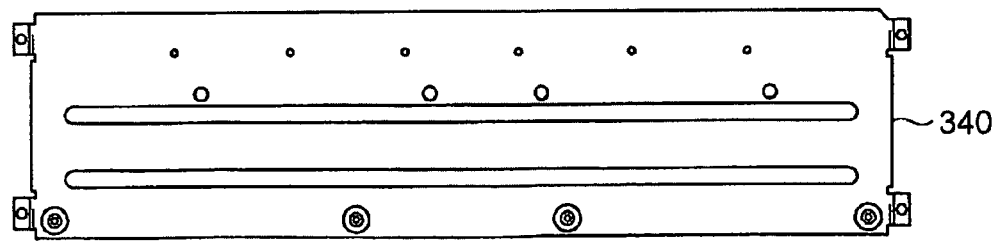

FIG. 7 is a plan view showing a configuration of the base plate 340. FIG. 7A is a front view of the base plate 340 seen from the rear surface side of the display displaying unit 300, FIG. 7B is a bottom view of FIG. 7A, and FIG. 7C is rear view of FIG. 7A. The base plate 340 is configured from a press molded metal plate. As shown in FIG. 7, a plurality of screw holes 342, 344 is formed in the base plate 340. The screw hole 342 is used to fix the first hinge plate 362 and the second hinge plate 364. The other screw hole 344 is used to fixe components of the display displaying unit 300 such as the T-substrate 350 and the T-cover 430.

The bezel 310 is fixed to the periphery of the organic EL panel 320 through adhesion. As shown in FIG. 6, an opening 312 for exposing the display screen 300a of the organic EL panel 320 is formed in the bezel 310.

FIGS. 8 is a frame format views showing a configuration of the rear cover 420. FIG. 8A is a front view of the rear cover 420 seen from the front surface side of the display displaying unit 300, and FIG. 8B is a rear view of the rear cover 420 seen from the rear surface side of the display displaying unit 300.

FIGS. 9 is a frame format view showing a configuration of the T-cover 430. FIG. 9A is a front view of the T-cover 430 seen from the front surface side of the display displaying unit 300, FIG. 9B is a left side view, FIG. 9C is a right side view, FIG. 9D is a top view, FIG. 9E is a bottom view, FIG. 9F is a rear view, and FIG. 9G is a cross sectional view taken along a chain dashed line III-III' in FIG. 9A.

As shown in FIG. 8, an opening 422 is formed in the rear cover 420 in correspondence to the position of the base plate 340, the T-substrate 350, and the hinge 360. A pass-through hole 424 for inserting the screw to fix the rear cover 420 is formed in the rear cover 420. The rear cover 420 is fixed with respect to the bezel 310, as described later, to cover the upper part of the rear surface side of the organic EL panel 320.

Figure 10:
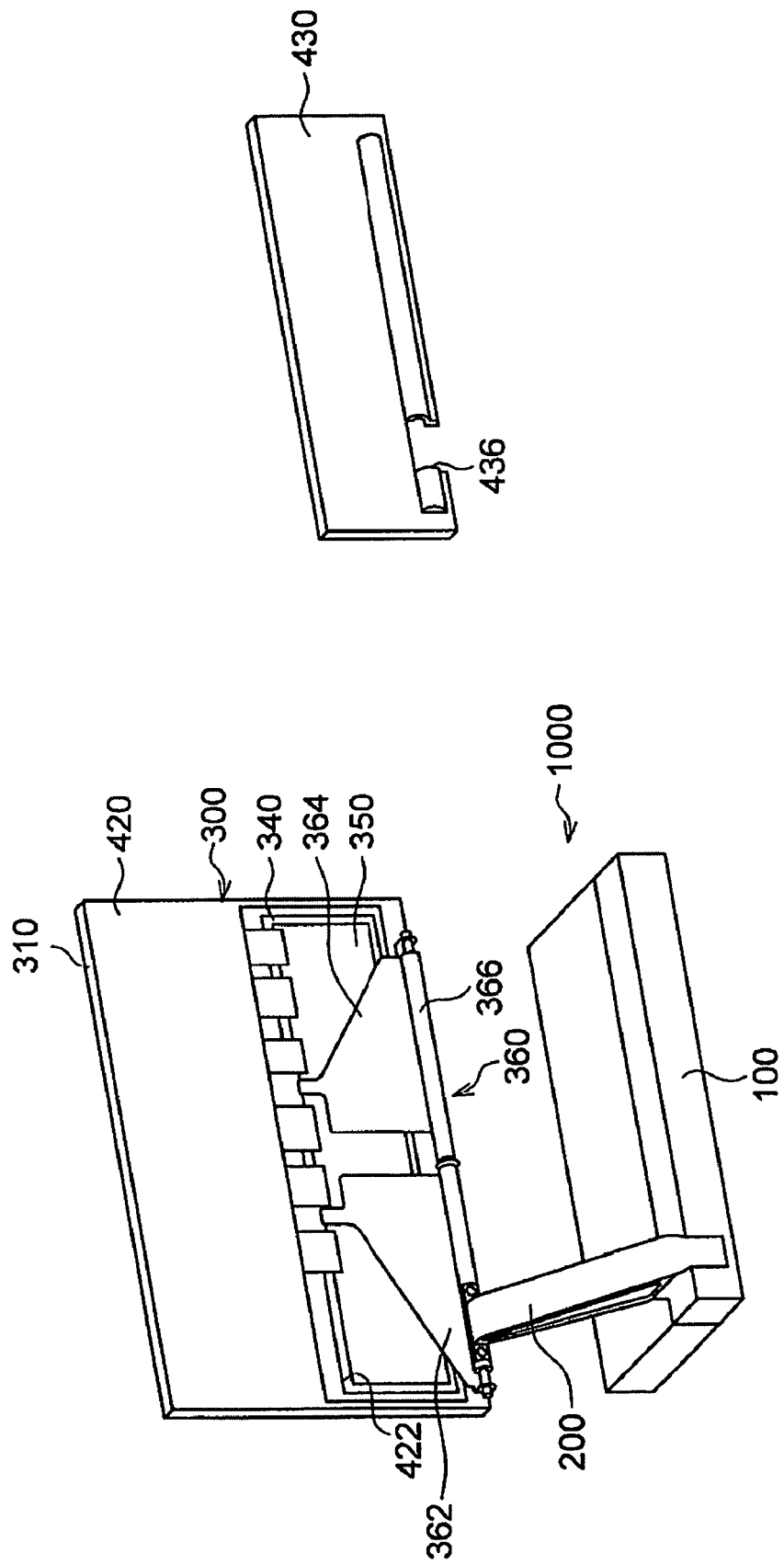
FIG. 10 is a frame format view showing a state of the display device seen from the rear surface side with the T-cover detached.

FIG. 10 shows a state of the display device 1000 seen from the rear surface side with the T-cover 430 detached. The base plate 340, the T-substrate 350, and the hinge 360 are arranged in the region on the lower side of the display displaying unit 300, where the T-substrate 350 and the hinge 360 are exposed to the outside from the opening 422 of the rear cover 420 with the T-cover 430 detached.

As shown in FIG. 9, the T-cover 430 includes a concave part 432 corresponding to the shaft 366 of the hinge 360, and a concave part 434 corresponding to a region arranged with the base plate 340, the T-substrate 350, the first hinge plate 362, and the second hinge plate 364. A cutout 436 is formed in the T-cover 430 at a position corresponding to the arm unit 200.

When the T-cover 430 is placed over the rear cover 420, the shaft 366 is accommodated in the concave part 432, and the T-substrate 350, the first hinge plate 362, and the second hinge plate 364 are accommodated in the concave part 434. Thus, the configuring members such as the T-substrate 350 and the hinge 360 are covered with the T-cover 430, as shown in FIG. 1B. The arm unit 200 is projected towards the back side from the cutout 436 of the T-cover 430.

Therefore, only the rear cover 420, the T-cover 430, and the arm unit 200 are exposed to the outside at the rear surface side of the display displaying unit 300, and a very simple and sophisticated outer appearance can be obtained. In particular, the display displaying unit 300 that is very thin and that has a floating feeling and lightness can be configured since the configuring members related to thickness at the upper side of the display displaying unit 300 are mainly three members of the organic EL panel 320, the graphic sheet 330, and the rear cover 420. The display displaying unit 300 having sufficient strength while being very thin can be configured since the base plate 340 is a rigid member of the display displaying unit 300 and the main components of the display displaying unit 300 are fixed with respect to the base plate 340.

[Configuration of Hinge]

Figure 11:
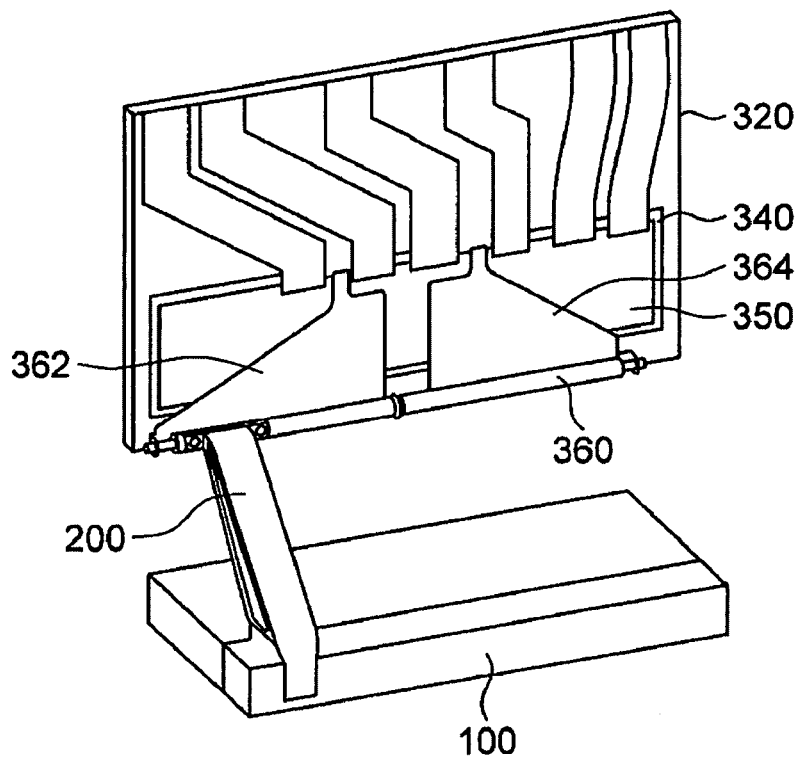
FIG. 11 is a frame format view showing a state in which members such as rear cover and bezel are detached from the state of FIG. 10.
Figure 12:
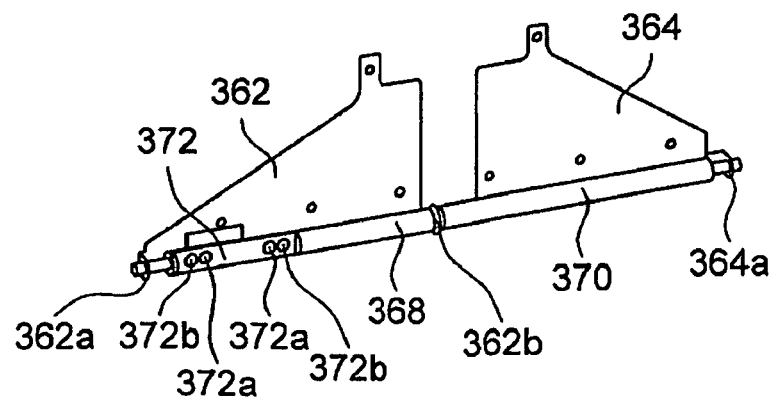
FIG. 12 is a perspective view showing a configuration of a hinge.

FIG. 11 is a view showing a state of the display device 1000 seen from the rear surface side, showing a state in which the members such as the rear cover 420 and the bezel 310 are detached from the state of FIG. 10. FIG. 12 is a perspective view showing a configuration of the hinge 360.

FIG. 13 is a frame format view showing a configuration of the hinge 360 in detail. FIG. 13A is a front view of the hinge 360 seen from the rear surface side of the display displaying unit 300, FIG. 13B is a right side view, FIG. 13C is a top view, FIG. 13D is a bottom view, and FIG. 13E is a rear view.

The shaft 366 of the hinge 360 is fixed with respect to the arm unit 200. As shown in FIGS. 4A to 4G, a receiving surface 202 to be attached with the shaft 366 is arranged at the distal end of the upper part of the arm unit 200. A boss 202a and a hole 202b are formed in the receiving surface 202.

As shown in FIG. 12, a flat surface 372 is formed at one part of the outer peripheral surface of the shaft 366. The flat surface 372 is formed with a hole 372a to be inserted with the boss 202a of the receiving surface 202 of the arm unit 200. The flat surface 372 is formed with a screw hole 372b at a position corresponding to the hole 202b.

The flat surface 372 contacts the receiving surface 202 of the arm unit 200, and the boss 202a is inserted to the hole 372a. In this state, the screw is inserted to the hole 202b from the back side of the arm unit 200 and screwed into the screw hole 372b so that the shaft 366 is fixed to the arm unit 200. As shown in FIG. 11, the shaft 366 of the hinge 360 and the arm unit 200 are integrated. The integrated shaft 366 and the arm unit 200 become a rigid member that supports the display displaying unit 300.

The shaft 366 is arranged horizontally along the lower side of the display displaying unit 300. The first hinge plate 362 and the second hinge plate 364 are turnably engaged to the shaft 366 with the shaft 366 as the center axis of rotation.

Figure 13C:
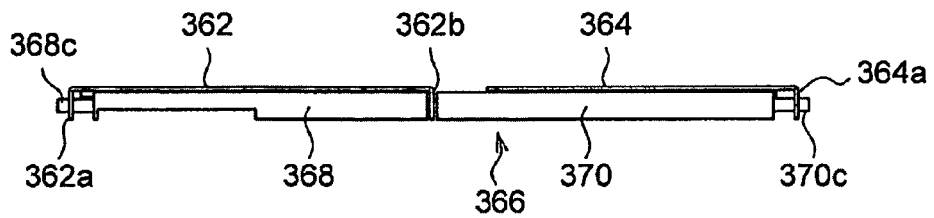
FIGS. 13A to 13E are frame format views showing a configuration of the hinge in detail.
Figure 13A:
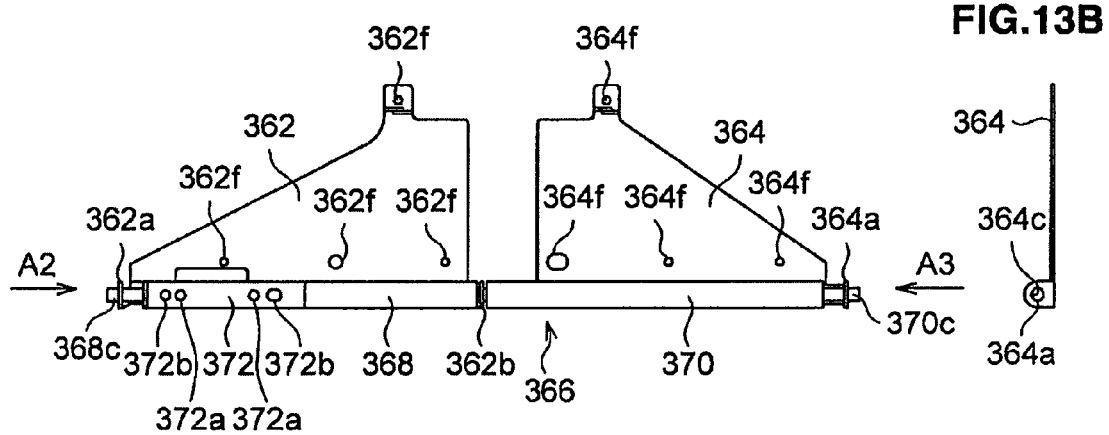

As shown in FIG. 13A, a plurality of holes 362f is formed in the first hinge plate 362. A plurality of holes 364f is formed in the second hinge plate 364. The holes 362f, 364f correspond to the position of the screw hole 342 of the base plate 340, and the first hinge plate 362 and the second hinge plate 364 are fixed with respect to the base plate 340 with the T-substrate 350 interposed in between the base plate 340 by screwing in the screw inserted to the holes 362f, 364f to the screw hole 342 of the base plate 340. The first hinge plate 362 and the second hinge plate 364 thereby become strength members for ensuring the rigidity of the display displaying unit 300 with the base plate 340.

FIG. 14 is a frame format view showing a configuration of the shaft 366 in detail. FIG. 14A is a front view showing the shaft 366 from the rear surface side of the display displaying unit 300, the right side view, and the left side view. FIG. 14B is a cross section taken along the center axis of the shaft 366. FIG. 14C is a cross section taken along a chain dashed line IV-IV' in FIG. 14A.

As shown in FIG. 14, the shaft 366 is divided at the middle to include two shafts 368 and 370. The above-described flat surface 372 is arranged on the shaft 368.

As shown in FIGS. 14A and 14B, a groove 375 is formed at a portion where the shaft 368 and the shaft 370 are coupled. An engagement shaft 368a to be inserted to an engagement hole 370a of the shaft 370 is arranged at the end of the shaft 368. The flat surface 370g is formed at the end of the shaft 370.

As shown in FIG. 14B, two holes 368b to be inserted with a pin 369 are formed at the engagement shaft 368a of the shaft 368. Two holes 370b to be inserted with the pin 369 are formed at the portion where the flat surface 370g of the shaft 370 is formed.

The shaft 368 and the shaft 370 are fixed by inserting and caulking the pin 369 to the hole 368b and the 370b with the engagement shaft 368a inserted to the engagement hole 370a. In this case, the outer diameter of the pin 369 and the inner diameter of the hole 368b and the hole 370b are fitted and fixed by caulking.

As shown in FIG. 14A, an engagement shaft 368c is arranged at the end of the shaft 368 on the side opposite to the engagement shaft 368a. The engagement shaft 368d is arranged at the position of the groove 357. A hole 368e of a predetermined depth is formed along the center axis in the engagement shaft 368c. An engagement groove 368f of a predetermined depth is formed at one part of the end face of the engagement shaft 368c.

Similarly, an engagement shaft 370c is arranged at the end of the shaft 370. A hole 370e of a predetermined depth is formed along the center axis in the engagement shaft 370c. An engagement groove 370f of a predetermined depth is formed at one part of the end face of the engagement shaft 370c.

As shown in FIGS. 12, and 13, two engagement parts 362a, 362b that engage with the engagement shafts 368c, 368d at both ends of the shaft 368 are formed at both ends of the first hinge part 362 through bend processing. A pass-through hole 362c (not shown in FIGS. 12, and 13A to 13E) is formed in the engagement parts 362a, 362b.

Figure 13B:
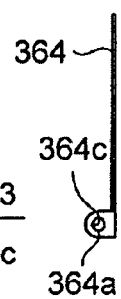
Figure 13D:
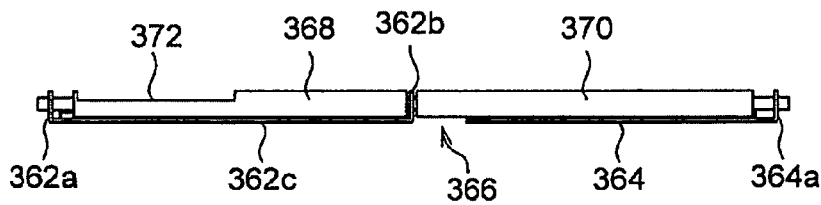
Figure 13E:
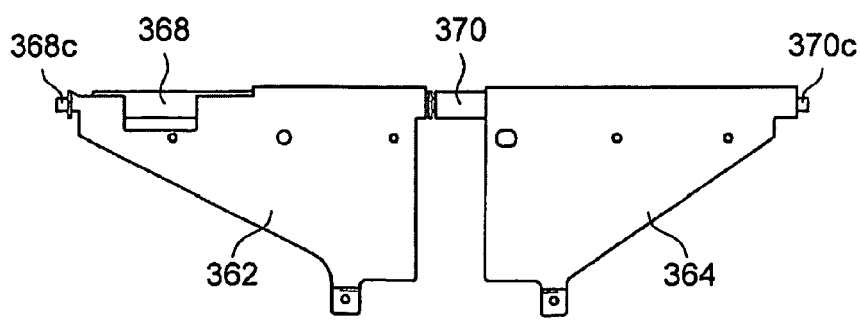

One engagement part 364a that engages the engagement shaft 370c arranged at one end of the shaft 370 is formed at one end of the second hinge plate 364 through bend processing. As shown in FIG. 13B, a pass-through hole 364c is formed in the engagement part 364a.

Figure 15A:
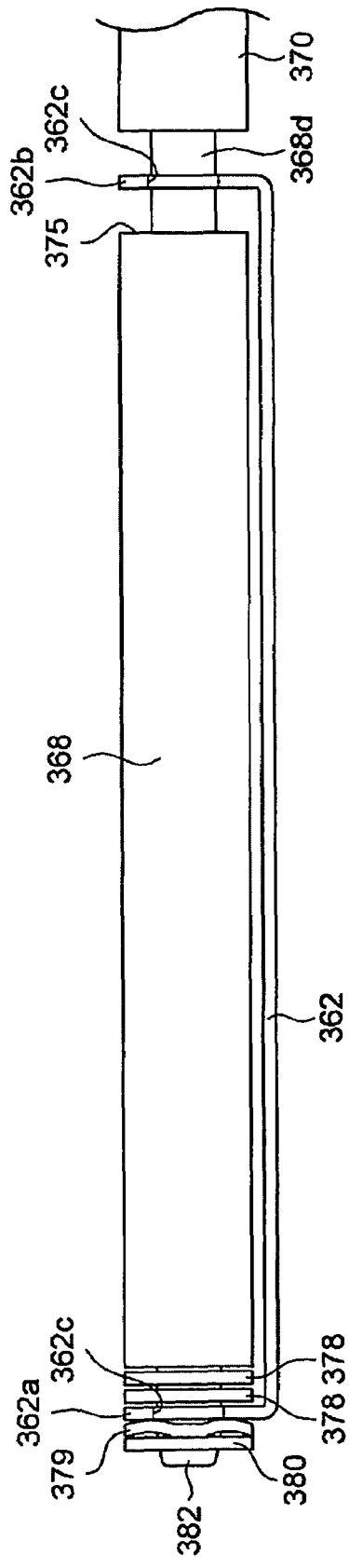
FIGS. 15A and 15B are frame format views showing an engagement state of a first hinge plate and a second hinge plate, and the shaft.
Figure 15B:
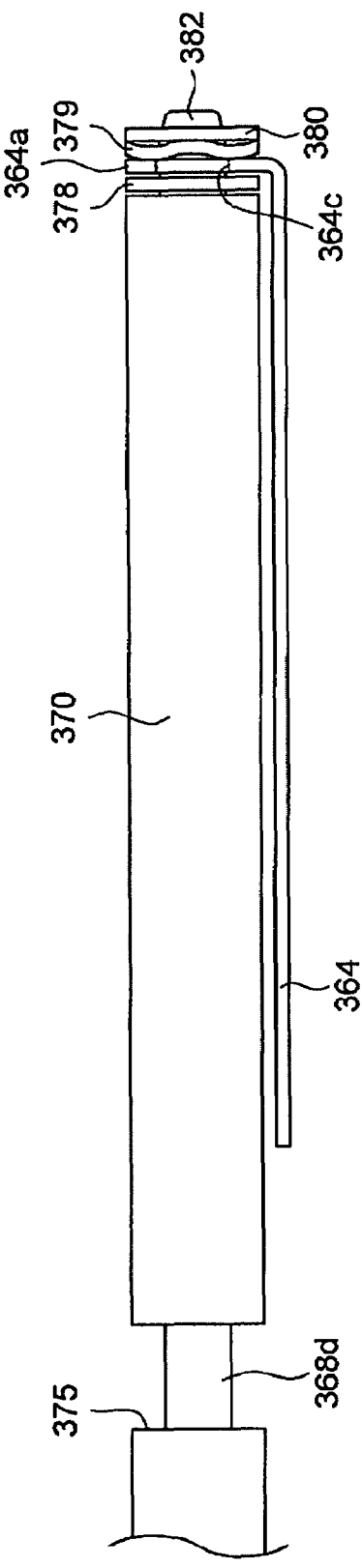

FIG. 15 is a frame format view showing an engagement state of the first hinge plate 362 and the second hinge plate 364, and the shaft 366, showing the shaft 366 from the lower side of the display displaying unit 300. FIG. 15A shows a state in which the first hinge plate 362 is turnably attached to the shaft 366. FIG. 15B shows a state in which the second hinge plate 364 is turnably attached to the shaft 366.

As shown in FIG. 15A, the pass-through hole 362c of the engagement part 362a of the first hinge part 362 is inserted to the engagement shaft 368c of the shaft 368 with a washer 378 inserted to the engagement shaft 368c. The pass-through hole 362c of the engagement part 362b is inserted to the engagement shaft 368d. A lock position regulating plate 380 is attached to the distal end of the engagement shaft 368c with a spring washer 379 inserted to the engagement shaft 368c, and a caulking pin 382 is pushed into the hole 368e thereby fixing the caulking pin 382 to the hole 368e. The lock position regulating plate 380 is fixed at the distal end face of the engagement shaft 368c, and the first hinge plate 362 is turnably attached to the shaft 368.

As shown in FIG. 15B, the pass-through hole 364c of the engagement part 364a of the second hinge plate 364 is inserted to the engagement shaft 370c with a washer 378 inserted to the engagement shaft 370c, and a spring washer 379 is inserted to the engagement shaft 370c. The lock position regulating plate 380 is attached to the distal end of the engagement shaft 370c, and the caulking pin 382 is pushed into the hole 370e thereby fixing the caulking pin 382 to the hole 370e. The lock position regulating plate 380 is fixed at the distal end face of the engagement shaft 370c, and the second hinge plate 364 is turnably attached to the shaft 370.

When assembling the hinge 360, the pass-through hole 362c of the engagement part 362b of the first hinge plate 362 is first inserted to the engagement shaft 368d of the shaft 368 with the shaft 366 separated into the shaft 368 and the shaft 370. The washer 378 is inserted to the engagement shaft 368c, and the pass-through hole 362c of the engagement part 362a is inserted to the engagement shaft 368c.

The engagement shaft 368a of the shaft 368 is inserted to the engagement hole 370a of the shaft 370, the pin 369 is inserted and caulked to the hole 368b and the hole 370b to fix and integrate the shaft 368 and the shaft 370. A groove 375 is formed between the shaft 368 and the shaft 370, and the engagement part 362b is engaged with the engagement shaft 368d in the groove 375.

The washer 378 is then inserted to the engagement shaft 370c of the shaft 370, and the pass-through hole 364c of the engagement part 364a of the second hinge part 364 is inserted to the engagement shaft 370c. The spring washer 379 is inserted to the engagement shaft 368c and the engagement shaft 370c at both ends of the shaft 366, the lock position regulating plate 380 is attached to the distal end face of the engagement shaft 368c and the engagement shaft 370c, and the caulking pin 382 is inserted and caulked to the hole 368e and the hole 370e.

The first hinge plate 362 is turnably supported with respect to the shaft 366 since the pass-through hole 362c of the engagement parts 362a, 362b arranged at two locations are turnably engaged with respect to the engagement shafts 368c, 368d at both ends of the shaft 368. The second hinge plate 364 is turnably supported with respect to the shaft 366 since the pass-through hole 364c of the engagement part 364a arranged at one location is turnably engaged with respect to the engagement shaft 370c at one end of the shaft 370. Therefore, both the first hinge plate 362 and the second hinge plate 364 are turnably attached with respect to the shaft 366.

Therefore, the display displaying unit 300 can be turnably supported with the shaft 366 which is the rigid member as a center axis of rotation by attaching the first hinge plate 362 and the second hinge plate 364 to the base plate 340.

In the present embodiment, the first hinge plate 362 and the second hinge plate 364 are turnably supported with respect to the shaft 366, but one hinge plate may be turnably supported. However, if the shaft 366 is long, the hinge plate might deform in a direction away from the shaft at the middle portion in the longitudinal direction of the shaft 366 if the hinge plate is turnably supported at the engagement part arranged at both ends of one hinge plate. The hinge plate might twist in the rotating direction and a difference in rotation angle position might be created between both ends of the hinge plate, whereby the hinge plate is unable to rotate smoothly. If the hinge plate is divided into the first hinge plate 362 and the second hinge plate 364 and two engagement parts 362a, 362b are arranged at both ends of the first hinge plate 362 as in the present embodiment, the engaging location with the shaft 366 can be increased to three locations in the hinge plate as a whole, thereby suppressing the hinge plate from deforming in the direction away from the shaft near the middle portion of the shaft 366. The rigidity of each hinge plate is increased and the twist of the hinge plate can be suppressed by dividing the hinge plate, whereby the rotation angle positions of the first hinge plate 362 and the second hinge plate 364 at both ends of the shaft 366 become the same. Therefore, the first hinge plate 362 and the second hinge plate 364 smoothly turn with respect to the shaft 366, and the tilt operation of the display displaying unit 300 can be smoothly carried out.

Figure 16A:
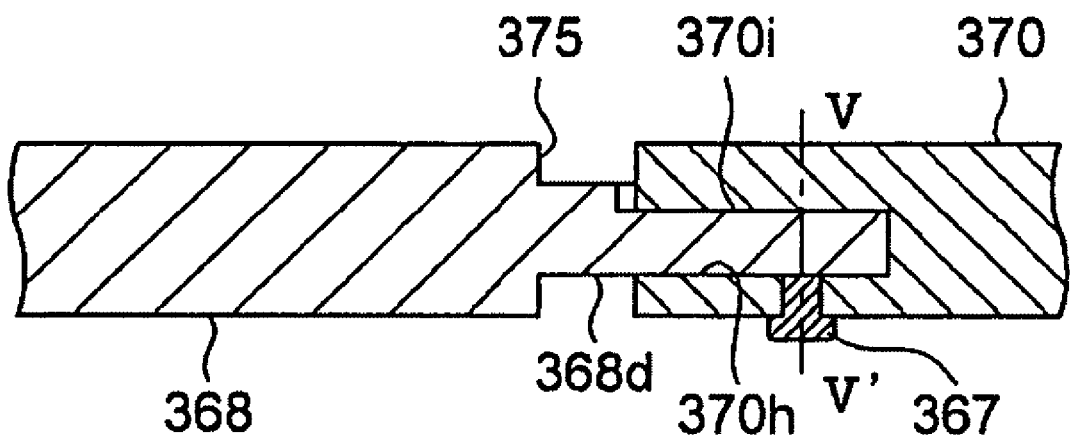
FIGS. 16A and 16B are frame format views showing another example of a configuration of a shaft.
Figure 16B:
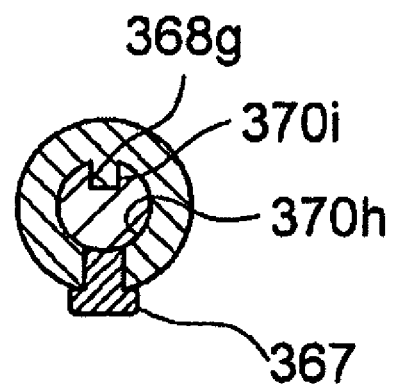

FIG. 16 is a frame format view showing another example of a configuration of connecting the shaft 368 and the shaft 370. FIG. 16A is a cross section taken along the center axis of the shaft 366. FIG. 16B is a frame format view showing a cross section taken along a chain dashed line V-V' in FIG. 16A. In the example of FIG. 16, the engagement shaft 368d of the shaft 368 is inserted to a hole 370h of the shaft 370, and a key 370i of the hole 370h and the key groove 368g of the engagement shaft 368d are engaged to regulate the angular position of the shaft 368 and the shaft 370. The shaft 368 and the shaft 370 are configured so that the shaft 368 does not slip out from the shaft 370 by caulking the fixing caulking pin 367 to the shaft 370. In such configuration as well, the angular positions of the engagement groove 368f of the shaft 368 and the engagement groove 370f of the shaft 370 can be regulated, and the position at where the tilt position is locked becomes the same in both the first hinge plate 362 and the second hinge plate 364.

[Configuration of Body Stand Unit]

Figure 17:
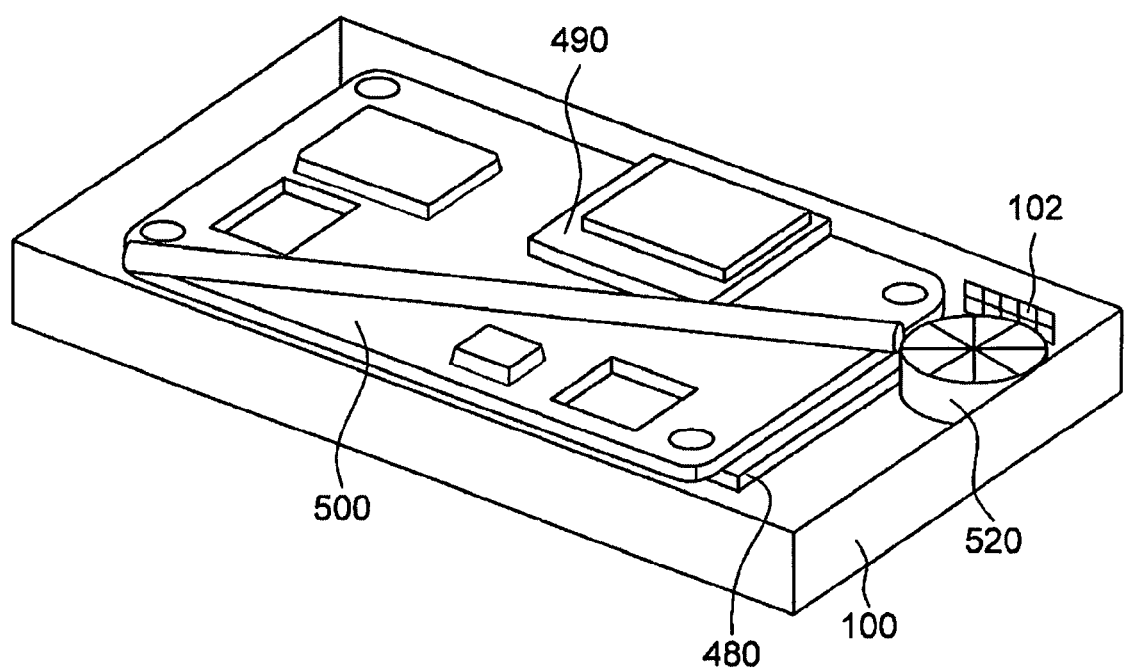
FIG. 17 is an exploded perspective view showing a schematic configuration of the body stand unit.

FIG. 17 is an exploded perspective view showing a schematic configuration of the body stand unit 100, showing a state in which the cover on the upper surface of the body stand unit 100 is detached. The housing of the body stand unit 100 is made of metal. A circuit substrate (O substrate) 480 for performing signal processing to drive the display displaying unit 300, a circuit substrate (B-CAS substrate) 490, a cooling fan 520, a radiator plate (heat spreader) 500, and the like are compactly incorporated inside the body stand unit 100. Various terminals such as tuner for satellite broadcast (BS, CS), ground digital wave etc., LAN, HDMI, USB, and the like are incorporated in the body stand unit 100, and a rod antenna 104 (see FIG. 1B) for receiving the ground digital wave is arranged on the back surface side. A speaker box, an operation button, and the like are also incorporated in the body stand unit 100.

It should be understood by those skilled in the art that various modifications, combinations, sub-combinations and alterations may occur depending on design requirements and other factors insofar as they are within the scope of the appended claims or the equivalents thereof.

While preferred embodiments of the present invention have been described with reference to the accompanying drawings, it is to be understood that the present invention is not limited thereto. It should be apparent to those skilled in the art that various modifications and variations are possible within the scope of the Claims, and that all such modifications and variations are intended to be within the technical scope of the present invention.

What is claimed is:

1. A display device comprising:

a body unit;

a display panel of flat plate shape arranged with a display screen;

at least one hinge plate connected to a rear surface of the display panel;

shafts arranged extending along a lower end of the display panel, and turnably attached with the hinge plate with respect to a center axis; and a supporting unit, connected to the shaft at an upper end and connected to the body unit at a lower end, for supporting a display unit in a cantilever state.

2. The display device according to claim 1, wherein the hinge plate includes an engagement part turnably inserted to at least both ends of the shaft.

3. The display device according to claim 2, wherein the hinge plate is divided to at least two or more parts.

4. The display device according to claim 3, wherein the shaft is configured by at least two or more divided shafts corresponding to the divided hinge plate.

5. The display device according to claim 4, wherein at least one of the divided hinge plates further includes an engagement part turnably inserted to a vicinity of a coupling part of the divided shaft.

* * * * *